(12) United States Patent
Hakola et al.

(10) Patent No.: US 11,044,003 B2
(45) Date of Patent: Jun. 22, 2021

(54) BEAM INDICATION

(71) Applicant: NOKIA TECHNOLOGIES OY, Espoo (FI)

(72) Inventors: Sami-Jukka Hakola, Kempele (FI); Mihai Enescu, Espoo (FI); Juha Pekka Karjalainen, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

(21) Appl. No.: 16/763,062

(22) PCT Filed: Nov. 17, 2017

(86) PCT No.: PCT/EP2017/079607
§ 371 (c)(1),
(2) Date: May 11, 2020

(87) PCT Pub. No.: WO2019/096405
PCT Pub. Date: May 23, 2019

(65) Prior Publication Data
US 2020/0350971 A1 Nov. 5, 2020

(51) Int. Cl.
*H04B 7/06* (2006.01)
*H04L 1/18* (2006.01)
(Continued)

(52) U.S. Cl.
CPC ......... *H04B 7/0695* (2013.01); *H04L 1/1812* (2013.01); *H04L 5/0048* (2013.01);
(Continued)

(58) Field of Classification Search
CPC ... H04B 7/9695; H04L 1/1812; H04L 5/0048; H04W 24/10; H04W 72/042; H04W 72/085; H04W 72/046
(Continued)

(56) References Cited

U.S. PATENT DOCUMENTS

2020/0068549 A1* 2/2020 Kang .................. H04B 7/0695

FOREIGN PATENT DOCUMENTS

WO    WO 2017/196612 A1    11/2017

OTHER PUBLICATIONS

3GPP TSG RAN WG1 #90 R1-1714248 Aug. 2017.*
(Continued)

*Primary Examiner* — William Nealon
(74) *Attorney, Agent, or Firm* — Squire Patton Boggs (US) LLP

(57) ABSTRACT

There are provided measures for improved beam indication. Such measures exemplarily comprise storing at least one beam determination entry, wherein each of said at least one beam determination entry is indicative of a respective first beam and at least one respective second beam narrower than said first beam and at least partially in quasi co-location with said first beam, receiving indicator information indicative of one of said at least one beam determination entry, and selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

13 Claims, 19 Drawing Sheets

(51) Int. Cl.
  *H04L 5/00* (2006.01)
  *H04W 24/10* (2009.01)
  *H04W 72/08* (2009.01)
  *H04W 72/04* (2009.01)

(52) U.S. Cl.
  CPC ......... *H04W 24/10* (2013.01); *H04W 72/042* (2013.01); *H04W 72/085* (2013.01); *H04W 72/046* (2013.01)

(58) Field of Classification Search
  USPC ....................................................... 455/450
  See application file for complete search history.

(56) References Cited

OTHER PUBLICATIONS

3GPP TSG RAN WG1 #89 R1-1708929 May 2017.*
3GPP TSG RAN WG1 90bis R1-1718238 Oct. 2017.*
3GPP TSG RAN WG1 90bis R1-1718511 Oct. 2017.*
3GPP TSG RAN WG1 90bis R1-1717301 Oct. 2017.*
International Search Report and Written Opinion dated Jul. 23, 2018 corresponding to International Patent Application No. PCT/EP2017/079607.
Nokia et al: "Beam indication," 3GPP Draft; R1-1714248, vol. RAN WG1, Prague, Czech Republic, Aug. 20, 2017, XP051317035.

* cited by examiner

BEAM INDICATION

FIELD

The present invention relates to improved beam indication. More specifically, the present invention exemplarily relates to measures (including methods, apparatuses and computer program products) for realizing improved beam indication.

BACKGROUND

In 3$^{rd}$ Generation Partnership Project (3GPP) New Radio (NR) the user equipment (UE) may be configured with a set of candidate transmit beams for a downlink control channel (PDCCH, physical downlink control channel) and a downlink data channel (PDSCH, physical downlink shared channel) reception. The configuration may be implemented by means of a table where each row may represent one transmit beam with its parameters. Parameters can be e.g. a source reference signal which characterizes the transmit beam.

For the PDCCH reception the UE may be configured with a table where either for each control resource set (CORESET) or search space there is an associated downlink reference signal (RS) resource corresponding to a "transmit" beam. CORESET or search space configuration indicates a "timedomain" pattern when to assume that the certain transmission (TX) beam may be used for PDCCH transmission and thus UE would be able to set its reception (RX) beam properly for the certain PDCCH blind detection occasion.

For the PDSCH reception, the UE may be configured with a table where each table index is associated to a certain downlink (DL) RS corresponding to a certain "transmit beam". Scheduling PDCCH may then provide the UE with the index to indicate which TX beam is used for PDSCH transmission in dynamic manner.

The UE may be configured with transmit beams belonging to one or multiple transmission and reception points (TRPs) of a cell.

One exemplary realization of the transmission configuration indication (TCI) states table of a UE in radio resource control (RRC) Connected state is as shown in the table below (Indicator table for quasi co-location (QCL) association between DL RS and demodulation reference signal (DMRS) of new radio physical downlink shared channel (NR-PDSCH)). The UE may be configured with multiple "candidate TX beams" of different types that may be characterized by (detected and measured by UE): synchronization signal (SS) block beam, periodic channel state indicator reference signal (CSI-RS) or aperiodic CSI-RS based beam. New radio physical downlink control channel (NR-PDCCH) which schedules NR-PDSCH would indicate in downlink control information (DCI) the used indicator state for NR-PDSCH.

| Indicator state | RS set (configured RS set TX beam RS included in) | RS type | RS index (characterizes TX beam) |
|---|---|---|---|
| '000' | SS blocks of the cell | SS block | SS block index # 3 |
| '001' | SS blocks of the cell | SS block | SS block index # 4 |
| '010' | CSI-RS res. set # A | Periodic CSI-RS | CRI # 2 (of set # A) |
| '011' | CSI-RS res. set # C | Periodic CSI-RS | CRI # 1 (of set # C) |
| '100' | CSI-RS res. set # D | Aperiodic CSI-RS | CRI # 0 (of set # D) |
| ... | ... | ... | ... |
| 'int2bin(M-1)' | ... | ... | ... |

To support NR-PDCCH monitoring in case of multiple candidate TX beams for NR-PDCCH with different monitoring periodicities (duty cycles), one possibility is to configure UE with one CORESET and e.g. two search spaces with different periodicities where each search could be associated to a certain TX beam for NR-PDCCH transmission. On the other hand, it should be possible to configure also different CORESETs for the UE with different periodicities, and the search spaces would follow periodicity of the corresponding CORESET. In one alternative, the UE can be configured with multiple CORESETs each associated with a certain "transmit beam" and search space per CORESET then defines when the UE can assume certain transmit beam may be used (i.e. when to expect PDCCH may be transmitted on certain CORESET).

A configured QCL table associating DL RS index and DMRS of NR-PDCCH could be as follows:

| Configuration index | CORESET config | Search space config | RS set (configured RS set TX beam RS included in) | RS index (characterizes TX beam) | Note |
|---|---|---|---|---|---|
| '000' | CORESET # 0 | SS # 0 | CSI-RS set # A | CRI # 2 (of set # A) | Monitoring pattern of search space e.g. all slots except every 5$^{th}$ slot |
| '001' | CORESET # 0 | SS # 1 | SS blocks of the cell | SS block # 3 | Periodicity of search space e.g. every 5$^{th}$ slot |

For uplink (UL) beam management, similar approaches and principles can be taken as for DL beam management, i.e. UE can be configured with an indicator state table providing QCL association between RS and DMRS of a physical uplink shared channel (PUSCH) or DMRS of an physical uplink control channel (PUCCH). A RS can be a downlink RS like an SS block and/or a CSI-RS and an uplink RS like a physical random access channel (PRACH) preamble and/or a sounding reference signal (SRS). It is to be noted that for UL beam management there are only agreements related to SRS TX beam indication.

According to such agreements, it is intended that NR adopts the SRS Tx beam indication, i.e., by a SRS resource or by a DL RS, and that the supported DL RS at least includes CSI-RS and a synchronization signal block (SSB). Corresponding reference signal in SSB may be a secondary synchronization signal (SSS), a demodulation reference signal (DMRS) of a physical broadcast channel (PBCH) or both SSS and DMRS of the PBCH.

That is, the UE should derive its spatial transmit filter for SRS transmission based on a measurement on the DL RS, or should use the same as for some other SRS resource.

An indicator state to use for NR-PUCCH or NR-PUSCH transmission could be signaled in a DCI used to allocate both transmissions. Updating the indicator state tables could also follow the signaling used for downlink tables i.e. using RRC$_+$ MAC based signaling where RRC may (re-)configure the states and set of source reference signals and MAC may then re-map certain source reference signals to certain configured state.

An exemplary indicator state table could be formed as follows in the table below (Indicator table for QCL association between RS and DMRS of NR-PUCCH/NR-PUSCH) for NR-PUCCH/NR-PUSCH.

| Indicator state | RS set | RS type | RS index |
|---|---|---|---|
| '000' | SRS res. set # A | Periodic SRS | SRI # 2 (of res. set A) |
| '001' | SRS res. set # B | Aperiodic SRS | SRI # 1 (of res. set B) |
| '010' | SS blocks of a cell | SS block | SS block # 3 |
| '011' | CSI-RS res. set # C | Periodic CSI-RS | CRI # 1 (of set # C) |

NR also specifies so a called grant-free transmission for uplink where the UE gets transmission configurations in RRC and UL transmissions take place without explicit UL grant. L1 signaling can be used to modify some of the parameters like
   an offset associated with the periodicity with respect to a timing reference indicated by L1 signaling for activation
   a time domain resource allocation,
   a frequency domain resource allocation,
   a UE-specific DMRS configuration, and
   a modulation and coding scheme (MCS)/transport block size (TBS) value.

In view of the known prior art, the problem arises that beam indication is inefficient in particular since, as a baseline, different indicator state table configurations are configured for the UE for PDCCH, PDSCH, PUCCH and PUSCH. Further, the problem arises that beam indication is not provided for grant-free UL transmissions.

Hence, there is a need for an efficient beam indication e.g. in uplink and for beam indication for grant-free UL transmissions. In particular, there is a need to provide for improved beam indication.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising storing at least one beam determination entry, wherein each of said at least one beam determination entry is indicative of a respective first beam and at least one respective second beam narrower than said first beam and at least partially in quasi co-location with said first beam, receiving indicator information indicative of one of said at least one beam determination entry, and selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

According to an exemplary aspect of the present invention, there is provided a method comprising storing at least one quasi co-location configuration indicative of a respective first beam and at least one respective second beam narrower than said first beam and at least partially in quasi co-location with said first beam, storing, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration, and selecting, for a predetermined physical channel, said primary beam as a transmission beam.

According to an exemplary aspect of the present invention, there is provided a method comprising storing a downlink beam indication table indicative of available downlink beams, receiving indicator information indicative of an entry of said downlink beam indication table, and determining, for a predetermined physical channel, a transmission beam based on a downlink beam corresponding to said indicator information.

According to an exemplary aspect of the present invention, there is provided a method comprising providing at least one beam determination entry, wherein each of said at least one beam determination entry is indicative of a respective first beam and at least one respective second beam narrower than said first beam and at least partially in quasi co-location with said first beam, transmitting indicator information indicative of one of said at least one beam determination entry, and preparing for reception of traffic of a predetermined physical channel utilizing said first beam of said indicated one of said at least one beam determination entry.

According to an exemplary aspect of the present invention, there is provided a method comprising providing at least one quasi co-location configuration indicative of a respective first beam and at least one respective second beam narrower than said first beam and at least partially in quasi co-location with said first beam, and providing, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration.

According to an exemplary aspect of the present invention, there is provided a method comprising providing a downlink beam indication table indicative of available downlink beams, and transmitting indicator information indicative of an entry of said downlink beam indication table.

According to an exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform storing at least one beam determination entry, wherein each of said at least one beam determination entry is indicative of a respective first beam and at least one respective second beam narrower than said first beam and at least partially in quasi co-location with said first beam, receiving indicator information indicative of one of said at least one beam determination entry, and selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

According to an exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform storing at least one quasi co-location configuration indicative of a respective first beam and at least one respective second beam narrower than said first beam and at least partially in quasi co-location with said first beam, storing, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration, and selecting, for a predetermined physical channel, said primary beam as a transmission beam.

According to an exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform storing a downlink beam indication table indicative of available downlink beams, receiving indicator information indicative of an entry of said downlink beam indication table, and determining, for a predetermined physical channel, a transmission beam based on a downlink beam corresponding to said indicator information.

According to an exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform providing at least one beam determination entry, wherein each of said at least one beam determination entry is indicative of a respective first beam and at least one respective second beam narrower than said first beam and at least partially in quasi co-location with said first beam, transmitting indicator information indicative of one of said at least one beam determination entry, and preparing for reception of traffic of a predetermined physical channel utilizing said first beam of said indicated one of said at least one beam determination entry.

According to an exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform providing at least one quasi co-location configuration indicative of a respective first beam and at least one respective second beam narrower than said first beam and at least partially in quasi co-location with said first beam, and providing, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration.

According to an exemplary aspect of the present invention, there is provided an apparatus, comprising at least one processor, at least one memory including computer program code, and at least one interface configured for communication with at least another apparatus, the at least one processor, with the at least one memory and the computer program code, being configured to cause the apparatus to perform providing a downlink beam indication table indicative of available downlink beams, and transmitting indicator information indicative of an entry of said downlink beam indication table.

According to an exemplary aspect of the present invention, there is provided an apparatus, comprising storing circuitry configured to store at least one beam determination entry, wherein each of said at least one beam determination entry is indicative of a respective first beam and at least one respective second beam narrower than said first beam and at least partially in quasi co-location with said first beam, receiving circuitry configured to receive indicator information indicative of one of said at least one beam determination entry, and selecting circuitry configured to select, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

According to an exemplary aspect of the present invention, there is provided an apparatus, comprising storing circuitry configured to store at least one quasi co-location configuration indicative of a respective first beam and at least one respective second beam narrower than said first beam and at least partially in quasi co-location with said first beam, and to store, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration, and selecting circuitry configured to select, for a predetermined physical channel, said primary beam as a transmission beam.

According to an exemplary aspect of the present invention, there is provided an apparatus, comprising storing circuitry configured to store a downlink beam indication table indicative of available downlink beams, receiving circuitry configured to receive indicator information indicative of an entry of said downlink beam indication table, and determining circuitry configured to determine, for a predetermined physical channel, a transmission beam based on a downlink beam corresponding to said indicator information.

According to an exemplary aspect of the present invention, there is provided an apparatus, comprising providing circuitry configured to provide at least one beam determination entry, wherein each of said at least one beam determination entry is indicative of a respective first beam and at least one respective second beam narrower than said first beam and at least partially in quasi co-location with said first beam, transmitting circuitry configured to transmit indicator information indicative of one of said at least one beam determination entry, and preparing circuitry configured to prepare for reception of traffic of a predetermined physical channel utilizing said first beam of said indicated one of said at least one beam determination entry.

According to an exemplary aspect of the present invention, there is provided an apparatus, comprising providing circuitry configured to provide at least one quasi co-location configuration indicative of a respective first beam and at least one respective second beam narrower than said first beam and at least partially in quasi co-location with said first beam, and to provide, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration.

According to an exemplary aspect of the present invention, there is provided an apparatus, comprising providing circuitry configured to provide a downlink beam indication table indicative of available downlink beams, and transmitting circuitry configured to transmit indicator information indicative of an entry of said downlink beam indication table.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient beam indication to thereby solve at least part of the problems and drawbacks identified in relation to the prior art.

By way of exemplary embodiments of the present invention, there is provided improved beam indication. More specifically, by way of exemplary embodiments of the present invention, there are provided measures and mechanisms for realizing improved beam indication.

Thus, improvement is achieved by methods, apparatuses and computer program products enabling/realizing improved beam indication.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP NR specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) improved beam indication.

Figure 1:
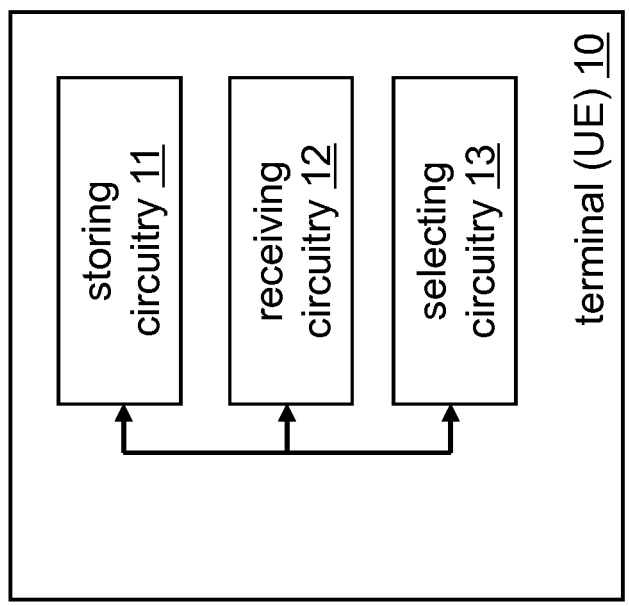
FIG. 1 is a block diagram illustrating an apparatus according to exemplary embodiments of the present invention.

FIG. 1 is a block diagram illustrating an apparatus according to exemplary embodiments of the present invention. The apparatus may be a terminal 10 such as a UE comprising a storing circuitry 11, a receiving circuitry 12, and a selecting circuitry 13. The storing circuitry 11 stores at least one beam determination entry, wherein each of said at least one beam determination entry is indicative of a respective first beam and at least one respective second beam narrower than said first beam and at least partially in quasi co-location with said first beam. The receiving circuitry 12 receives indicator information indicative of one of said at least one beam determination entry. The selecting circuitry 13 selects, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

Figure 12:
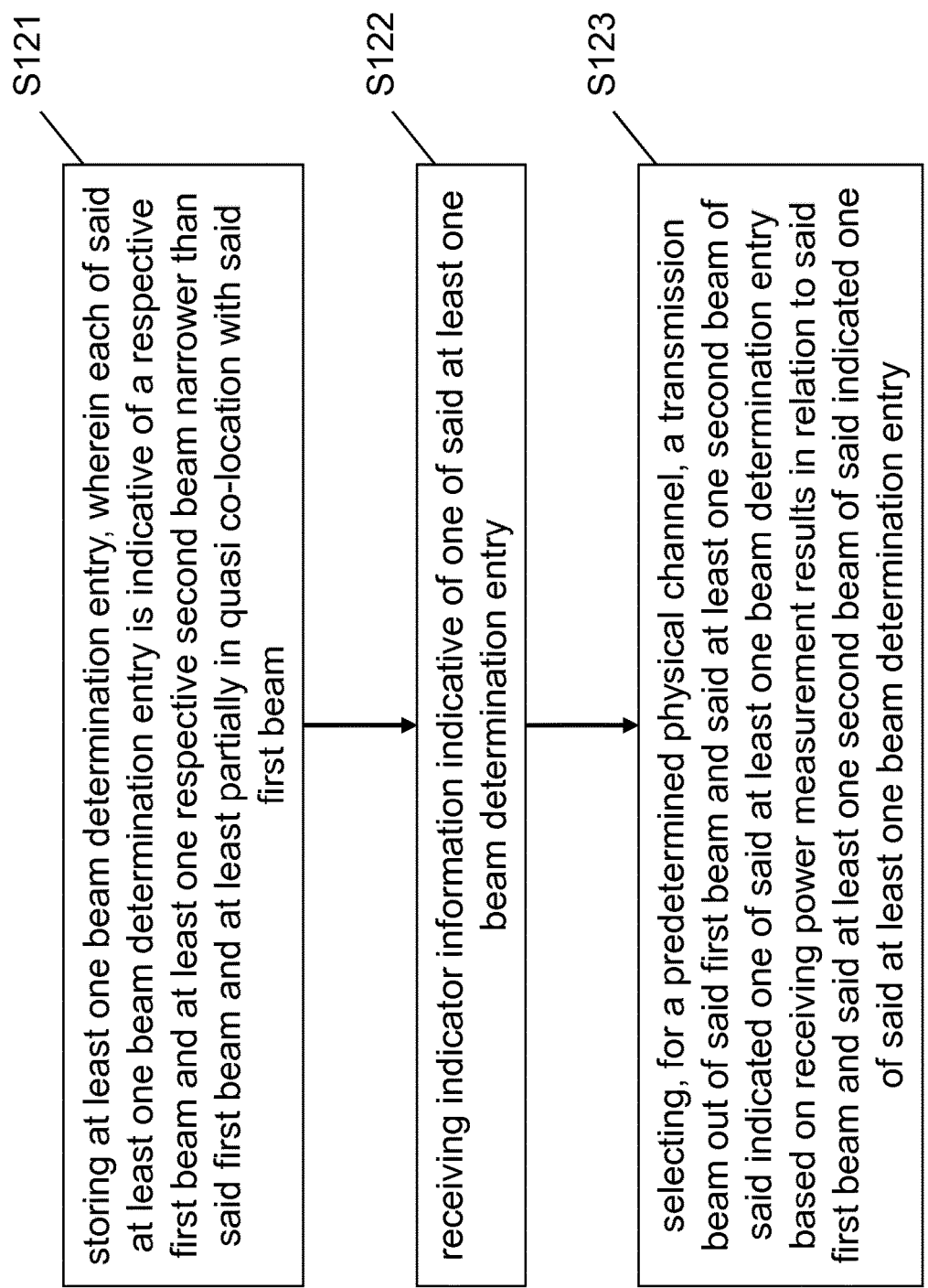
FIG. 12 is a schematic diagram of a procedure according to exemplary embodiments of the present invention.

FIG. 12 is a schematic diagram of a procedure according to exemplary embodiments of the present invention. The apparatus according to FIG. 1 may perform the method of FIG. 12 but is not limited to this method. The method of FIG. 12 may be performed by the apparatus of FIG. 1 but is not limited to being performed by this apparatus.

When in relation to exemplary embodiments of the present invention it is mentioned that beams are (at least partially) in quasi co-location, this shall also include arrangements in which in spatial domain the second beam is partially sharing the same characteristics of the first beam (e.g. transmitted to the spatial direction covered by the first beam) and where the first beam may be transmitted covering a wider spatial transmission aperture than the second beam at the transmitter.

As shown in FIG. 12, a procedure according to exemplary embodiments of the present invention comprises an operation of storing (S121) at least one beam determination entry, wherein each of said at least one beam determination entry is indicative of a respective first beam and at least one respective second beam narrower than said first beam and at least partially in quasi co-location with said first beam, an operation of receiving (S122) indicator information indicative of one of said at least one beam determination entry, and an operation of selecting (S123), for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

Figure 2:
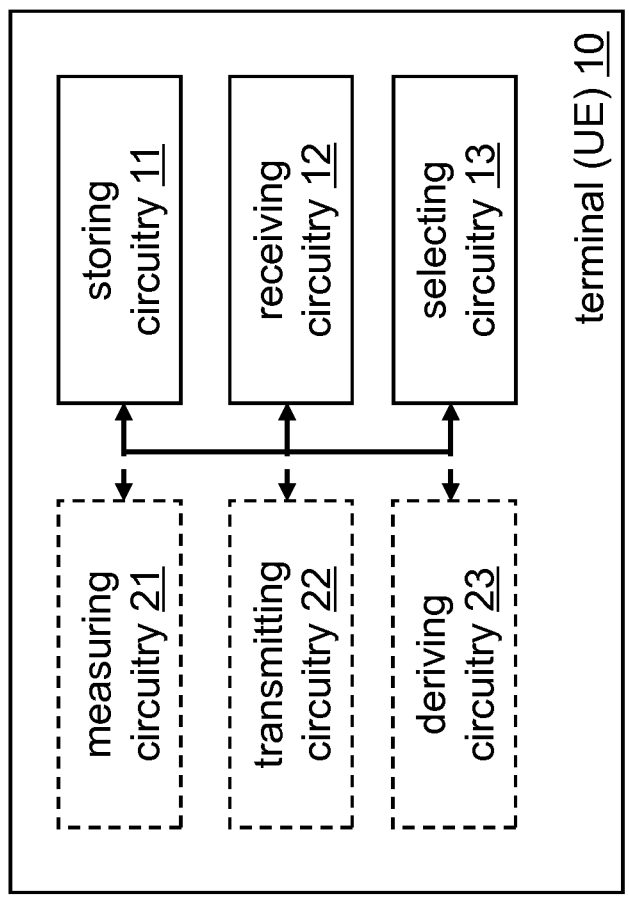
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a measuring circuitry 21, a transmitting circuitry 22, and/or a deriving circuitry 23.

In an embodiment at least some of the functionalities of the apparatus shown in FIG. 1 (2) may be shared between two physically separate devices forming one operational entity. Therefore, the apparatus may be seen to depict the operational entity comprising one or more physically separate devices for executing at least some of the described processes.

According to exemplary embodiments of the present invention, each of said at least one beam determination entry includes a respective identifier, and said indicator information corresponds to said identifier of said indicated one of said at least one beam determination entry.

According to a variation of the procedure shown in FIG. 12, exemplary additional operations are given, which are inherently independent from each other as such. According to such variation, an exemplary method according to exemplary embodiments of the present invention may comprise an operation of receiving said at least one beam determination entry.

According to a variation of the procedure shown in FIG. 12, exemplary additional operations are given, which are inherently independent from each other as such. According to such variation, an exemplary method according to exemplary embodiments of the present invention may comprise an operation of measuring a receiving power in relation to said first beam and said at least one second beam of said indicated one of said at least one beam determination entry.

According to a variation of the procedure shown in FIG. 12, exemplary additional operations are given, which are inherently independent from each other as such. According to such variation, an exemplary method according to exemplary embodiments of the present invention may comprise an operation of transmitting traffic of said predetermined physical channel utilizing said selected transmission beam.

According to exemplary embodiments of the present invention, each of said first beam and said at least one second beam of said indicated one of said at least one beam determination entry is represented by a respective reference signal.

According to a variation of the procedure shown in FIG. 12, exemplary additional operations are given, which are inherently independent from each other as such. According to such variation, an exemplary method according to exemplary embodiments of the present invention may comprise an operation of deriving a spatial transmission filter for said predetermined physical channel based on said selected transmission beam.

According to exemplary embodiments of the present invention, said selecting is based on receiving power measurement results in relation to said first beam, said at least one second beam, and a joint beam of said first beam and said at least one second beam.

According to exemplary embodiments of the present invention, a beam corresponding to the highest receiving power measurement result is selected.

According to exemplary embodiments of the present invention, said at least one second beam is selected if the receiving power measurement result in relation to said at least one second beam is higher than a predetermined threshold.

According to exemplary embodiments of the present invention, said at least one second beam is selected if the receiving power measurement result in relation to said at least one second beam is higher than the receiving power measurement result in relation to said first beam by at least a predetermined amount.

According to exemplary embodiments of the present invention being a variation of the procedure shown in FIG. 12, said first beam of said indicated one of said at least one beam determination entry is set as a default beam of said indicated one of said at least one beam determination entry, and said at least one second beam of said indicated one of said at least one beam determination entry is selected as said transmission beam.

According to such variation of the procedure shown in FIG. 12, exemplary additional operations are given, which are inherently independent from each other as such. According to such variation, an exemplary method according to exemplary embodiments of the present invention may comprise an operation of receiving a non-acknowledgement message, and an operation of selecting said default beam based on said non-acknowledgement message as said transmission beam.

According to exemplary embodiments of the present invention, said non-acknowledgement message is a hybrid automatic repeat request non-acknowledgement message.

According to exemplary embodiments of the present invention, said at least one beam determination entry is arranged in a beam indication table.

According to exemplary embodiments of the present invention, said first beam is a synchronization signal block beam.

According to exemplary embodiments of the present invention, said at least one second beam is a channel state information reference signal beam.

According to exemplary embodiments of the present invention, said predetermined physical channel is one of a physical uplink control channel and a physical uplink shared channel.

According to exemplary embodiments of the present invention, said at least one second beam at least partially in quasi co-location with said first beam is within a transmit aperture of said first beam.

According to exemplary embodiments of the present invention, said receiving power measurement result in relation to a specific beam is an L1 reference signal received power in relation to a reference signal representing said specific beam.

In more detail, according to exemplary embodiments of the present invention, the UE is configured with multiple DL RSs as a source RS to be used for UL beam indication for NR-PUCCH or NR-PUSCH. These DL RSs are QCLed (i.e., quasi co-located) in terms of spatial domain parameters together. E.g. one source DL RS is one SS block and the other is CSI-RS which is fully or partially QCLed in spatial sense with the SS block. Then further, the UE is configured (or given by spec) with a threshold or corresponding to determine which one of the RSs is to be used to derive spatial TX filter for NR-PUCCH or NR-PUSCH.

According to such exemplary embodiments of the present invention, a gNB (e.g. apparatus 70 below) would use as an RX beam the beam corresponding to the SS block beam (wider beam) and the UE may select its TX beam based on the SS block beam (wider beam) or the CSI-RS beam (more narrow beam) which is partially QCLed with the SS block beam (i.e. CSI-RS beam is within transmit aperture of SS block beam).

According to such exemplary embodiments of the present invention, the UE makes L1 reference signal received power (L1-RSRP) measurements on the given SS block and the CSI-RS and chooses source RS among the two based on measurement results based on predetermined rules.

Such rules may for example be
- the UE selects the source RS based on which L1-RSRP is higher,
- the UE selects the CSI-RS as a source RS for spatial filter determination for PUCCH/PUSCH if CSI-RS based L1-RSRP is higher than a configured threshold (i.e. a predetermined threshold), and/or
- the UE selects the CSI-RS as a source RS for spatial filter determination for PUCCH/PUSCH if CSI-RS based L1-RSRP is configured X dB (i.e. a predetermined amount)) higher than the SS block based L1-RSRP.

According to exemplary embodiments of the present invention, the UE is configured for the UL beam indication for PUCCH/PUSCH transmission in a way that two source RSs are defined, namely an SS block and a CSI-RS QCLed with SS block. The UE may then select its spatial transmit filter based on RSRP measurements on the SS block, the CSI-RS, and a joint SS block$_+$ CSI-RS measurement, if the SS block and the CSI-RS are configured into the same symbol.

According to such exemplary embodiments of the present invention, the gNB would use as an RX beam the beam corresponding to the SS block beam (wider beam), and the UE may select its TX beam based on the SS block beam (wider beam), the CSI-RS beam (more narrow beam) or a joint "SS block$_+$ CSI-RS beam" which are partially QCLed with the SS block beam (i.e. the CSI-RS beam is within a transmit aperture of the SS block beam).

Further, according to such exemplary embodiments of the present invention, a selection may be based on the similar rules as above, e.g., that depending on which L1-RSRP is highest the UE uses the corresponding spatial transmit filter for PUCCH/PUSCH transmission.

According to exemplary embodiments of the present invention, one of the DL RSs described above and configured into the same indicator state is determined as default DL RS for the state. In case of PUSCH transmission and in case the UE has used the more narrow beam as a reference for determination of spatial TX filter, receiving a hybrid automatic repeat request (HARQ) non-acknowledgement (NACK) for the PUSCH could trigger the UE to change to the default RS of the state.

Figure 3:
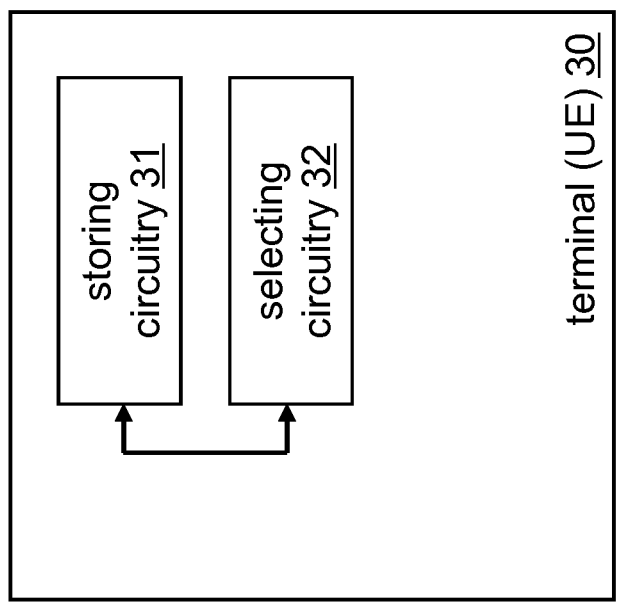
FIG. 3 is a block diagram illustrating an apparatus according to exemplary embodiments of the present invention.
Figure 13:
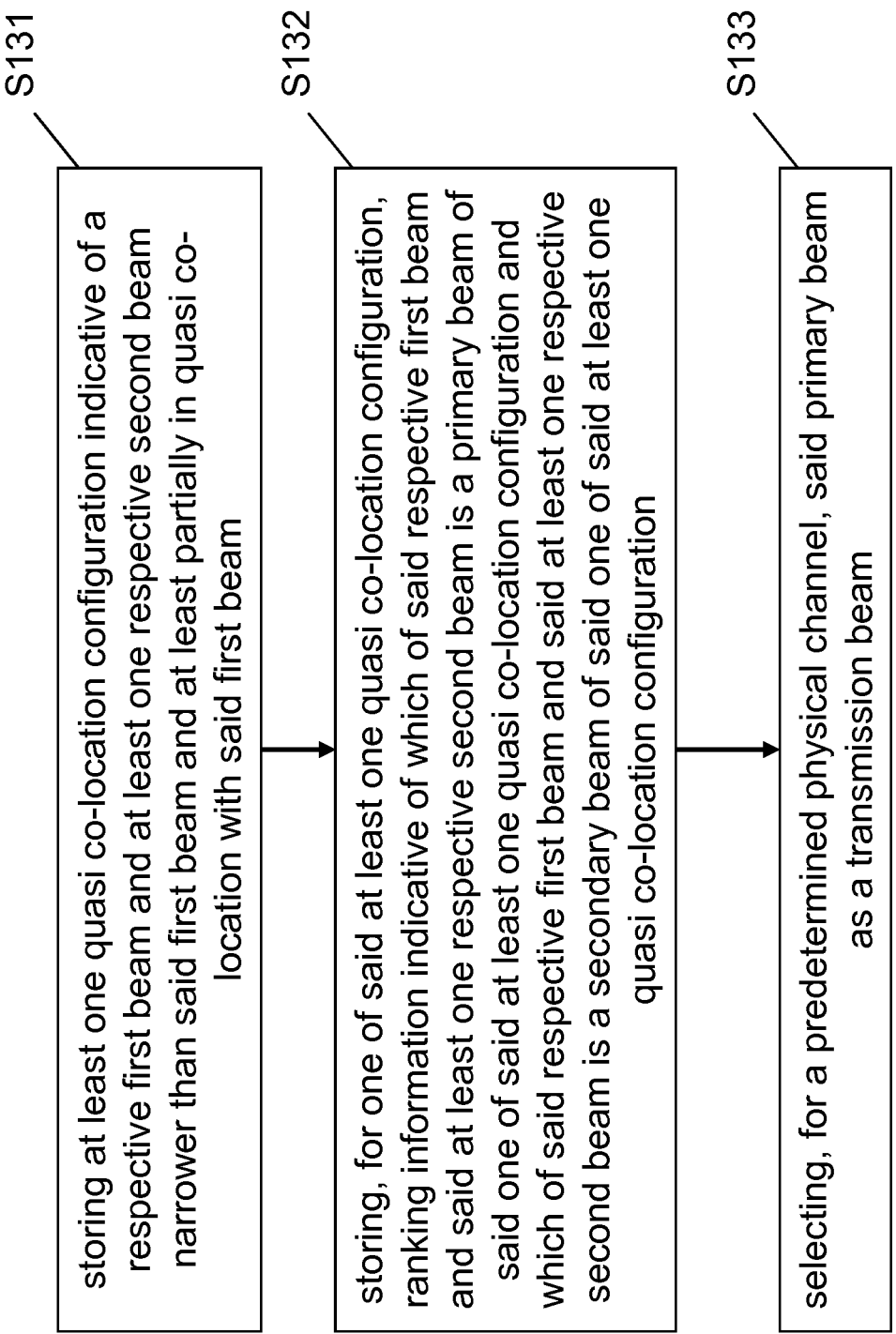
FIG. 13 is a schematic diagram of a procedure according to exemplary embodiments of the present invention.

FIG. 3 is a block diagram illustrating an apparatus according to exemplary embodiments of the present invention. The apparatus may be a terminal 30 such as a UE comprising a storing circuitry 31 and a selecting circuitry 32. The storing circuitry 31 stores at least one quasi co-location configuration indicative of a respective first beam and at least one respective second beam narrower than said first beam and at least partially in quasi co-location with said first beam. Further, the storing circuitry 31 stores, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration. The selecting circuitry 32 selects, for a predetermined physical channel, said primary beam as a transmission beam. FIG. 13 is a schematic diagram of a procedure according to exemplary embodiments of the present invention. The apparatus according to FIG. 3 may perform the method of FIG. 13 but is not limited to this method. The method of FIG. 13 may be performed by the apparatus of FIG. 3 but is not limited to being performed by this apparatus.

As shown in FIG. 13, a procedure according to exemplary embodiments of the present invention comprises an operation of storing (S131) at least one quasi co-location configuration indicative of a respective first beam and at least one respective second beam narrower than said first beam and at least partially in quasi co-location with said first beam, an operation of storing (S132), for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration, and an operation of selecting (S133), for a predetermined physical channel, said primary beam as a transmission beam.

Figure 4:
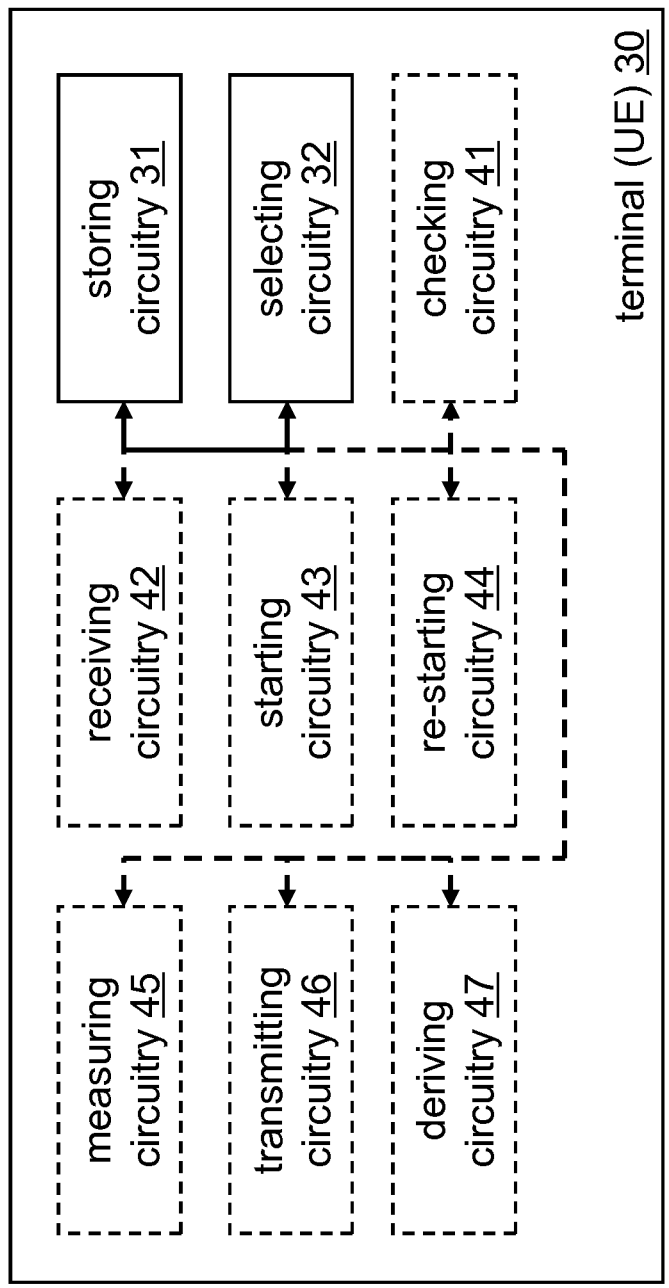
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a checking circuitry 41, a receiving circuitry 42, a starting circuitry 43, a re-starting circuitry 44, a measuring circuitry 45, a transmitting circuitry 46, and/or a deriving circuitry 47.

In an embodiment at least some of the functionalities of the apparatus shown in FIG. 3 (4) may be shared between two physically separate devices forming one operational entity. Therefore, the apparatus may be seen to depict the operational entity comprising one or more physically separate devices for executing at least some of the described processes.

According to a variation of the procedure shown in FIG. 13, exemplary additional operations are given, which are inherently independent from each other as such. According to such variation, an exemplary method according to exemplary embodiments of the present invention may comprise an operation of storing, for said one of said at least one quasi co-location configuration, timer information, an operation of checking whether a timer corresponding to said timer information has expired, and, if said timer corresponding to said timer information has expired, an operation of selecting, for said predetermined physical channel, said secondary beam as said transmission beam.

According to a variation of the procedure shown in FIG. 13, exemplary additional operations are given, which are inherently independent from each other as such. According to such variation, an exemplary method according to exemplary embodiments of the present invention may comprise an operation of receiving said at least one quasi co-location configuration and said ranking information, and an operation of starting, upon receiving said at least one quasi co-location configuration and said ranking information, said timer corresponding to said timer information.

According to a variation of the procedure shown in FIG. 13, exemplary additional operations are given, which are inherently independent from each other as such. According to such variation, an exemplary method according to exemplary embodiments of the present invention may comprise an operation of receiving a signaling indicative of a timer restart command, and an operation of re-starting said timer upon receiving said signaling.

According to a variation of the procedure shown in FIG. 13, exemplary additional operations are given, which are inherently independent from each other as such. According to such variation, an exemplary method according to exemplary embodiments of the present invention may comprise an operation of measuring a receiving power in relation to said primary beam and said secondary beam, and an operation of transmitting results of said measuring, and an operation of re-starting said timer, if said results of said measuring are indicative of that a receiving power in relation to said primary beam is higher than a predetermined threshold, and/or an operation of re-starting said timer, if said results of said measuring are indicative of that said receiving power in relation to said primary beam is higher than a receiving power in relation to said secondary beam.

According to a variation of the procedure shown in FIG. 13, exemplary additional operations are given, which are inherently independent from each other as such. According to such variation, an exemplary method according to exemplary embodiments of the present invention may comprise an operation of transmitting traffic of said predetermined physical channel utilizing said selected transmission beam.

According to a variation of the procedure shown in FIG. 13, exemplary additional operations are given, which are inherently independent from each other as such. According to such variation, an exemplary method according to exemplary embodiments of the present invention may comprise an operation of deriving a spatial transmission filter for said predetermined physical channel based on said selected transmission beam.

According to exemplary embodiments of the present invention, said first beam is a synchronization signal block beam.

According to exemplary embodiments of the present invention, said at least one second beam is a channel state information reference signal beam.

According to exemplary embodiments of the present invention, said predetermined physical channel is a physical uplink shared channel.

According to exemplary embodiments of the present invention, said at least one second beam at least partially in quasi co-location with said first beam is within a transmit aperture of said first beam.

In more detail, according to exemplary embodiments of the present invention, for grant-free UL transmission, the UE is configured with one or multiple QCL configurations for PUSCH to enable one or multiple TX beams for the UE. The configuration may indicate the UE a primary and secondary beam and a related timer.

According to such exemplary embodiments, the UE may use the configured primary TX beam for the PUSCH transmissions until the timer has been expired, and may then change to the configured secondary (fallback) beam.

According to such exemplary embodiments, further, the timer is started e.g. when the UE receives the configuration.

According to such exemplary embodiments, further, the timer may be re-started by L1 signalling from the gNB (e.g. apparatus 90 below). The gNB may configure independently the UE to transmit e.g. SRS using the primary TX beam and based on the beam measurement result the gNB may prolong the use of the primary beam for the grant-free transmission by sending an L1 signal (e.g. DCI in PDCCH transmitted to the UE).

According to such exemplary embodiments, further, if the transmitted measurement report indicates that the configured primary beam is stronger than a certain (configured) threshold or is above the secondary beam, the timer may be re-started at both gNB and UE.

Figure 5:
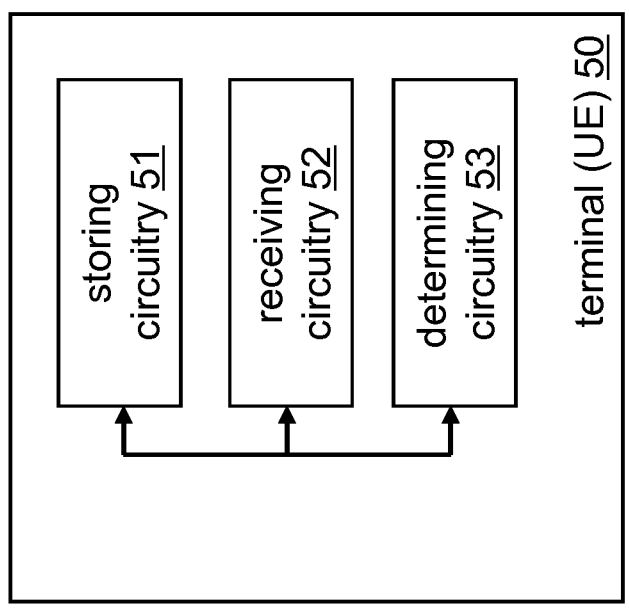
FIG. 5 is a block diagram illustrating an apparatus according to exemplary embodiments of the present invention.
Figure 14:
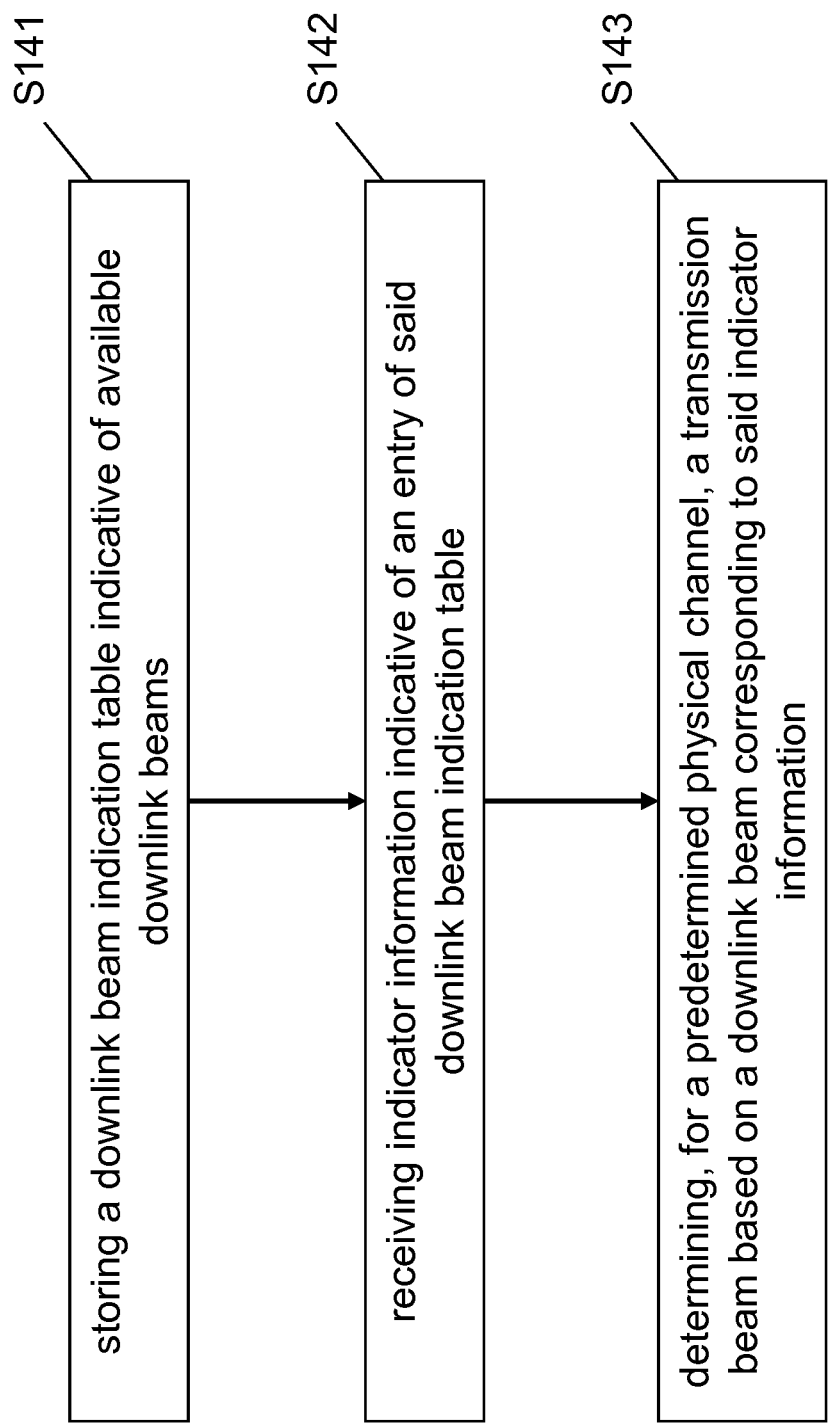
FIG. 14 is a schematic diagram of a procedure according to exemplary embodiments of the present invention.

FIG. 5 is a block diagram illustrating an apparatus according to exemplary embodiments of the present invention. The apparatus may be a terminal 50 such as a UE comprising a storing circuitry 51, a receiving circuitry 52, and a determining circuitry 53. The storing circuitry 51 stores a downlink beam indication table indicative of available downlink beams. The receiving circuitry 52 receives indicator information indicative of an entry of said downlink beam indication table. The determining circuitry 53 determines, for a predetermined physical channel, a transmission beam based on a downlink beam corresponding to said indicator information. FIG. 14 is a schematic diagram of a procedure according to exemplary embodiments of the present invention. The apparatus according to FIG. 5 may perform the method of FIG. 14 but is not limited to this method. The method of FIG. 14 may be performed by the apparatus of FIG. 5 but is not limited to being performed by this apparatus.

As shown in FIG. 14, a procedure according to exemplary embodiments of the present invention comprises an operation of storing (S141) a downlink beam indication table indicative of available downlink beams, an operation of receiving (S142) indicator information indicative of an entry of said downlink beam indication table, and an operation of determining (S143), for a predetermined physical channel, a transmission beam based on a downlink beam corresponding to said indicator information.

Figure 6:
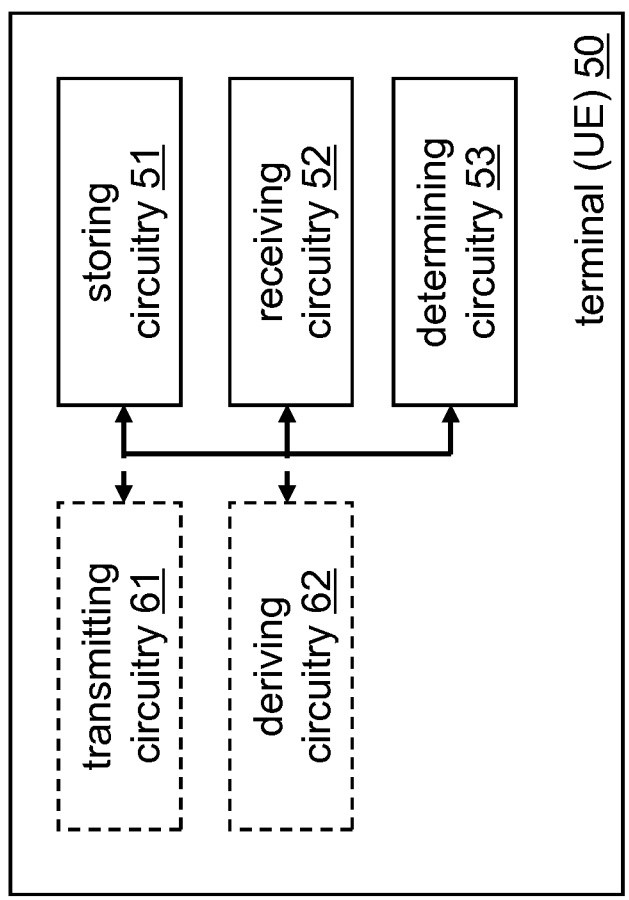
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise a transmitting circuitry 61 and/or a deriving circuitry 62.

In an embodiment at least some of the functionalities of the apparatus shown in FIG. 5 (6) may be shared between two physically separate devices forming one operational entity. Therefore, the apparatus may be seen to depict the operational entity comprising one or more physically separate devices for executing at least some of the described processes.

According to a variation of the procedure shown in FIG. 14, exemplary additional operations are given, which are inherently independent from each other as such. According to such variation, an exemplary method according to exemplary embodiments of the present invention may comprise an operation of transmitting traffic of said predetermined physical channel utilizing said determined transmission beam.

According to a variation of the procedure shown in FIG. 14, exemplary additional operations are given, which are inherently independent from each other as such. According to such variation, an exemplary method according to exemplary embodiments of the present invention may comprise an operation of deriving a spatial transmission filter for said predetermined physical channel based on said determined transmission beam.

In more detail, according to exemplary embodiments of the present invention, the UE is configured with beam indication tables for downlink and with grant-free transmission in uplink. The UE is assumed to support beam correspondence in this case. The gNB (e.g. apparatus 110 below) may indicate, using the DCI in PDCCH, the entry in the downlink beam indication table to be used as reference beam to calculate spatial transmit filter for the coming grant-free UL transmissions.

Figure 7:
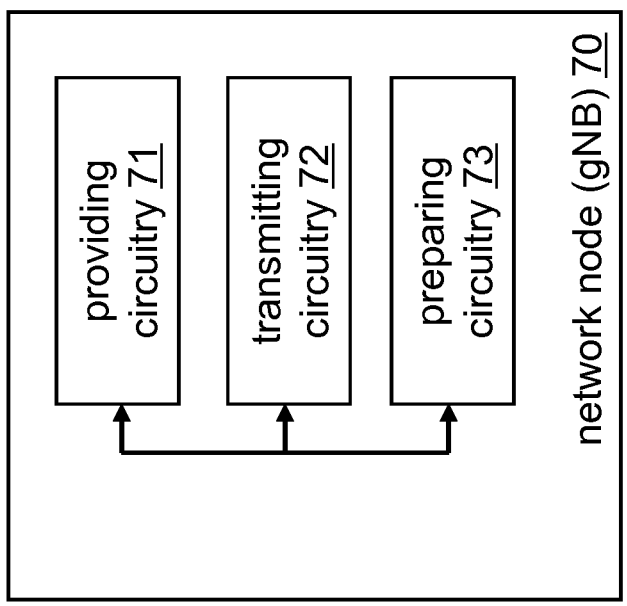
FIG. 7 is a block diagram illustrating an apparatus according to exemplary embodiments of the present invention.
Figure 15:
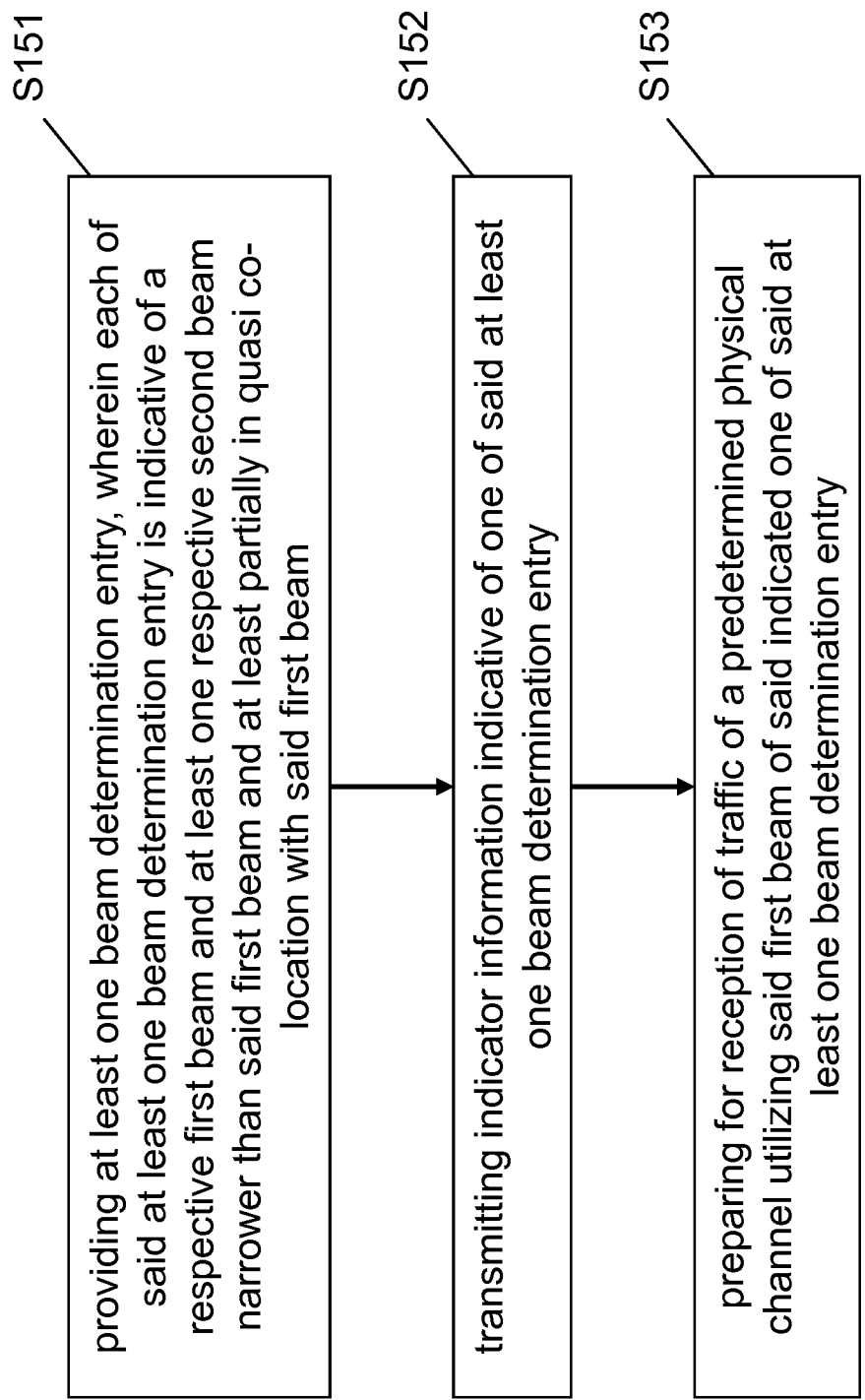
FIG. 15 is a schematic diagram of a procedure according to exemplary embodiments of the present invention.

FIG. 7 is a block diagram illustrating an apparatus according to exemplary embodiments of the present invention. The apparatus may be a network element 70 such as a gNB comprising a providing circuitry 71, a transmitting circuitry 72, and a preparing circuitry 73. The providing circuitry 71 provides at least one beam determination entry, wherein each of said at least one beam determination entry is indicative of a respective first beam and at least one respective second beam narrower than said first beam and at least partially in quasi co-location with said first beam. The transmitting circuitry 72 transmits indicator information indicative of one of said at least one beam determination entry. The preparing circuitry 73 prepares for reception of traffic of a predetermined physical channel utilizing said first beam of said indicated one of said at least one beam determination entry. FIG. 15 is a schematic diagram of a procedure according to exemplary embodiments of the present invention. The apparatus according to FIG. 7 may perform the method of FIG. 15 but is not limited to this method. The method of FIG. 15 may be performed by the apparatus of FIG. 7 but is not limited to being performed by this apparatus.

As shown in FIG. 15, a procedure according to exemplary embodiments of the present invention comprises an operation of providing (S151) at least one beam determination entry, wherein each of said at least one beam determination entry is indicative of a respective first beam and at least one respective second beam narrower than said first beam and at least partially in quasi co-location with said first beam, an operation of transmitting (S152) indicator information indicative of one of said at least one beam determination entry, and an operation of preparing (S153) for reception of traffic of a predetermined physical channel utilizing said first beam of said indicated one of said at least one beam determination entry.

Figure 8:
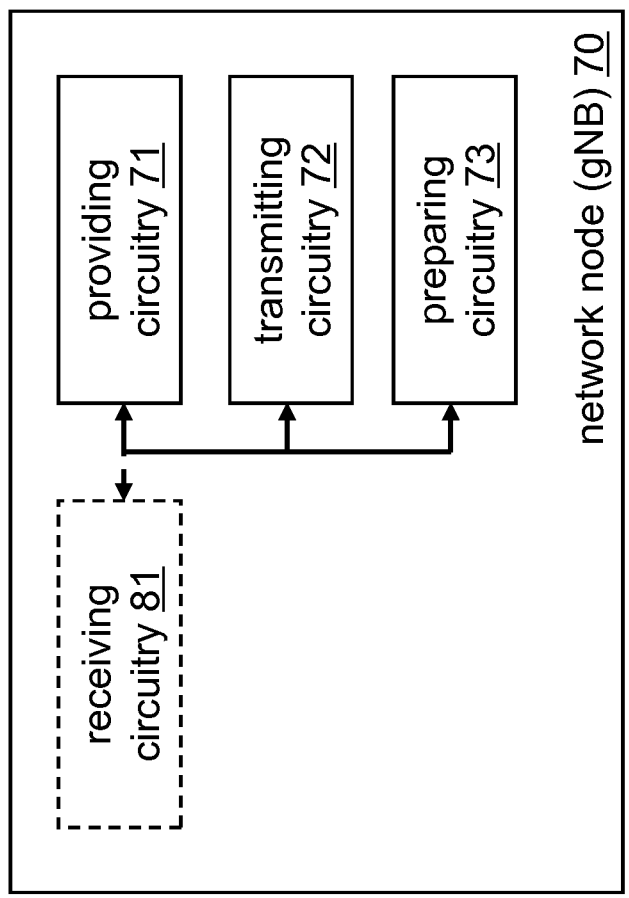
FIG. 8 is a block diagram illustrating an apparatus according to exemplary embodiments of the present invention.

FIG. 8 is a block diagram illustrating an apparatus according to exemplary embodiments of the present invention. In particular, FIG. 8 illustrates a variation of the apparatus shown in FIG. 7. The apparatus according to FIG. 8 may thus further comprise a receiving circuitry 81.

The apparatus 70 of FIG. 7 or 8 may be a counterpart of the apparatus 10 of FIG. 1 or 2, but is not limited thereto.

In an embodiment at least some of the functionalities of the apparatus shown in FIG. 7 (8) may be shared between two physically separate devices forming one operational entity. Therefore, the apparatus may be seen to depict the operational entity comprising one or more physically separate devices for executing at least some of the described processes.

According to exemplary embodiments of the present invention, each of said at least one beam determination entry includes a respective identifier, and said indicator information corresponds to said identifier of said indicated one of said at least one beam determination entry.

According to a variation of the procedure shown in FIG. 15, exemplary details of the providing (S151) operation are given, which are inherently independent from each other as such. Such exemplary providing operation according to exemplary embodiments of the present invention may comprise an operation of transmitting said at least one beam determination entry.

According to a variation of the procedure shown in FIG. 15, exemplary additional operations are given, which are inherently independent from each other as such. According to such variation, an exemplary method according to exemplary embodiments of the present invention may comprise an operation of receiving traffic of said predetermined physical channel transmitted via a transmission beam selected out of said first beam and said at least one second beam of said indicated one of said at least one beam determination entry utilizing said first beam of said indicated one of said at least one beam determination entry.

According to exemplary embodiments of the present invention, each of said first beam and said at least one second beam of said indicated one of said at least one beam determination entry is represented by a respective reference signal.

According to exemplary embodiments of the present invention, said at least one beam determination entry is arranged in a beam indication table.

According to exemplary embodiments of the present invention, said first beam is a synchronization signal block beam.

According to exemplary embodiments of the present invention, said at least one second beam is a channel state information reference signal beam.

According to exemplary embodiments of the present invention, said predetermined physical channel is one of a physical uplink control channel and a physical uplink shared channel.

According to exemplary embodiments of the present invention, said at least one second beam at least partially in quasi co-location with said first beam is within a transmit aperture of said first beam.

Figure 9:
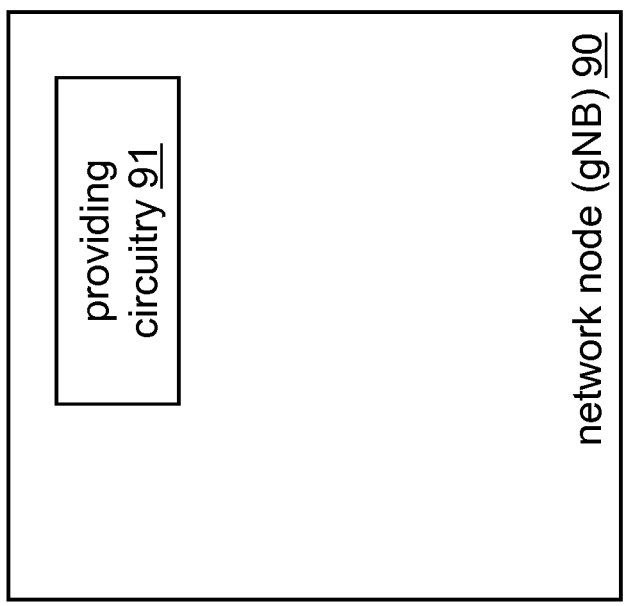
FIG. 9 is a block diagram illustrating an apparatus according to exemplary embodiments of the present invention.
Figure 16:
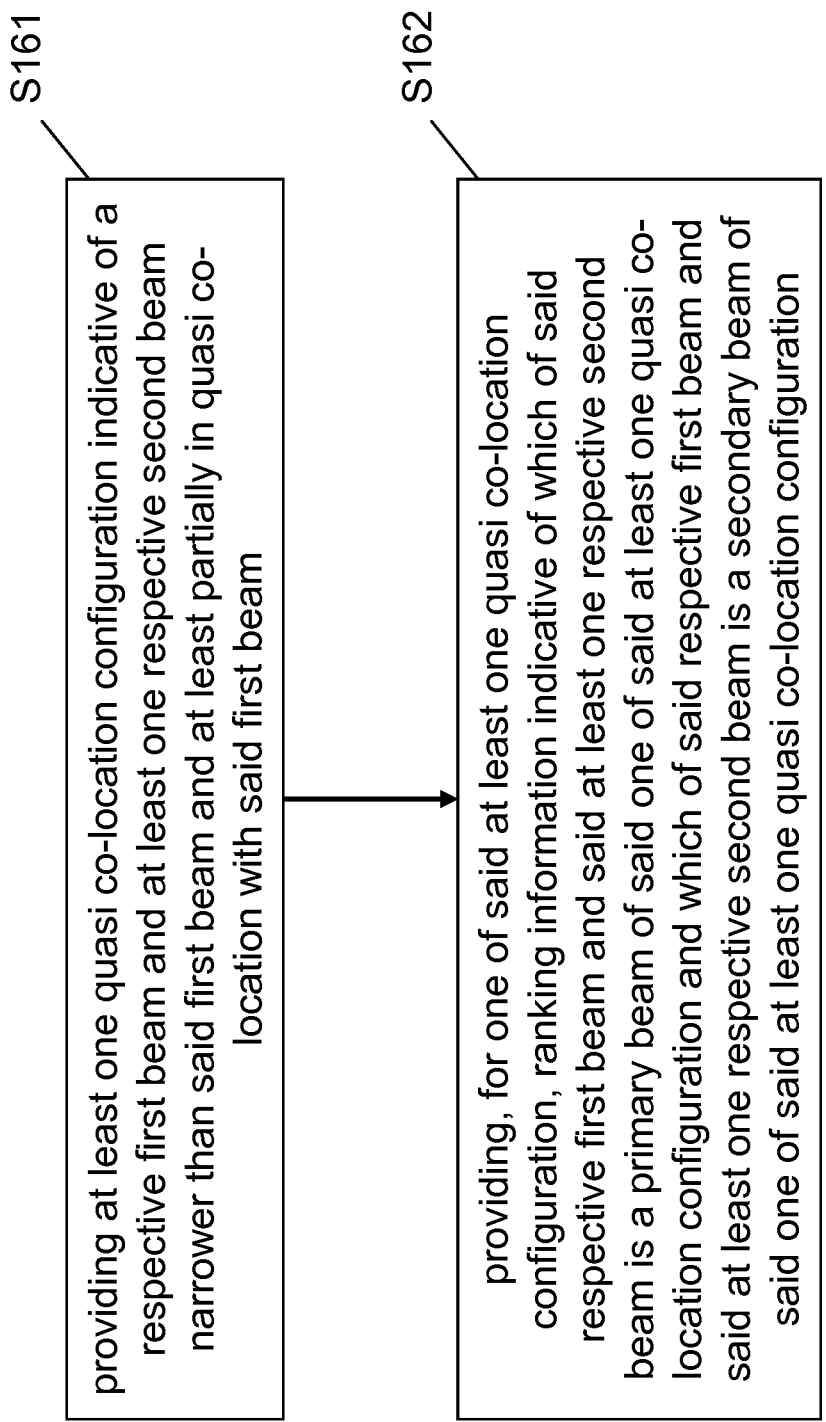
FIG. 16 is a schematic diagram of a procedure according to exemplary embodiments of the present invention.

FIG. 9 is a block diagram illustrating an apparatus according to exemplary embodiments of the present invention. The apparatus may be a network element 90 such as a gNB comprising a providing circuitry 91. The providing circuitry 91 provides at least one quasi co-location configuration indicative of a respective first beam and at least one respective second beam narrower than said first beam and at least partially in quasi co-location with said first beam. Further, the providing circuitry 91 provides, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration. FIG. 16 is a schematic diagram of a procedure according to exemplary embodiments of the present invention. The apparatus according to FIG. 9 may perform the method of FIG. 16 but is not limited to this method. The method of FIG. 16 may be performed by the apparatus of FIG. 9 but is not limited to being performed by this apparatus.

As shown in FIG. 16, a procedure according to exemplary embodiments of the present invention comprises an operation of providing (S161) at least one quasi co-location configuration indicative of a respective first beam and at least one respective second beam narrower than said first beam and at least partially in quasi co-location with said first beam, and an operation of providing (S162), for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration.

Figure 10:
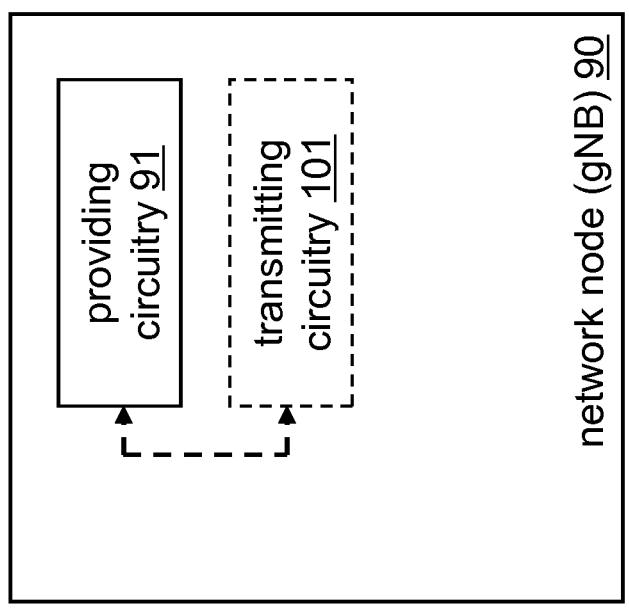
FIG. 10 is a block diagram illustrating an apparatus according to exemplary embodiments of the present invention.

FIG. 10 is a block diagram illustrating an apparatus according to exemplary embodiments of the present invention. In particular, FIG. 10 illustrates a variation of the apparatus shown in FIG. 9. The apparatus according to FIG. 10 may thus further comprise a transmitting circuitry 101.

The apparatus 90 of FIG. 9 or 10 may be a counterpart of the apparatus 30 of FIG. 3 or 4, but is not limited thereto.

In an embodiment at least some of the functionalities of the apparatus shown in FIG. 9 (10) may be shared between two physically separate devices forming one operational entity. Therefore, the apparatus may be seen to depict the operational entity comprising one or more physically separate devices for executing at least some of the described processes.

According to a variation of the procedure shown in FIG. 16, exemplary additional operations are given, which are inherently independent from each other as such. According to such variation, an exemplary method according to exemplary embodiments of the present invention may comprise an operation of providing, for said one of said at least one quasi co-location configuration, timer information indicative of validity of a preselection of said primary beam.

According to a variation of the procedure shown in FIG. 16, exemplary details of the providing operations (providing (S161) said at least one quasi co-location configuration and said providing (S162) said ranking information) are given, which are inherently independent from each other as such. Such exemplary providing operations according to exemplary embodiments of the present invention may comprise an operation of transmitting said at least one quasi co-location configuration and said ranking information.

According to a variation of the procedure shown in FIG. 16, exemplary additional operations are given, which are inherently independent from each other as such. According to such variation, an exemplary method according to exemplary embodiments of the present invention may comprise an operation of transmitting a signaling indicative of a timer restart command.

According to exemplary embodiments of the present invention, said first beam is a synchronization signal block beam.

According to exemplary embodiments of the present invention, said at least one second beam is a channel state information reference signal beam.

According to exemplary embodiments of the present invention, said at least one second beam at least partially in quasi co-location with said first beam is within a transmit aperture of said first beam.

Figure 11:
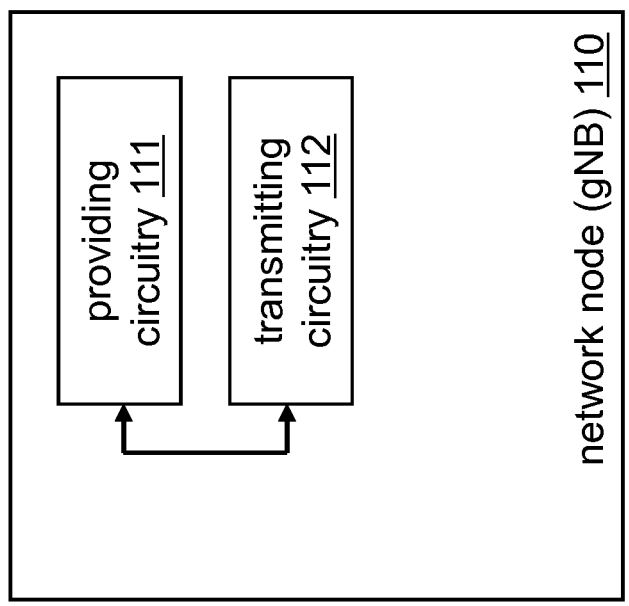
FIG. 11 is a block diagram illustrating an apparatus according to exemplary embodiments of the present invention.
Figure 17:
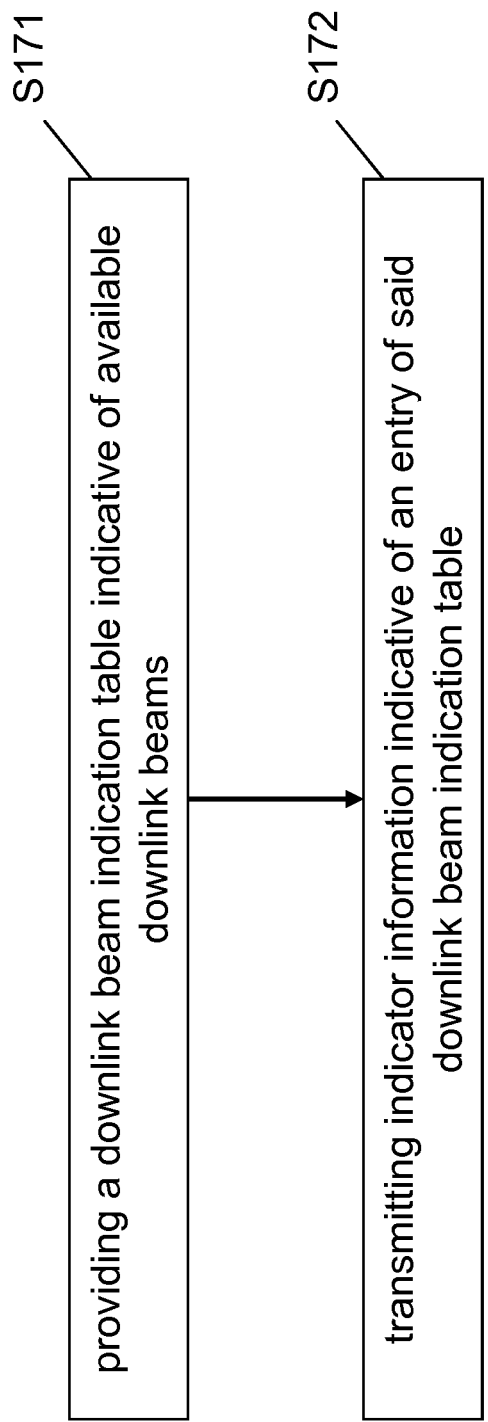
FIG. 17 is a schematic diagram of a procedure according to exemplary embodiments of the present invention.

FIG. 11 is a block diagram illustrating an apparatus according to exemplary embodiments of the present invention. The apparatus may be a network element 110 such as a gNB comprising a providing circuitry 111 and a transmitting circuitry 112. The providing circuitry 111 provides a downlink beam indication table indicative of available downlink beams. The transmitting circuitry 112 transmits indicator information indicative of an entry of said downlink beam indication table. FIG. 17 is a schematic diagram of a procedure according to exemplary embodiments of the present invention. The apparatus according to FIG. 11 may perform the method of FIG. 17 but is not limited to this method. The method of FIG. 17 may be performed by the apparatus of FIG. 11 but is not limited to being performed by this apparatus.

As shown in FIG. 17, a procedure according to exemplary embodiments of the present invention comprises an operation of providing (S171) a downlink beam indication table indicative of available downlink beams, and an operation of transmitting (S172) indicator information indicative of an entry of said downlink beam indication table.

The apparatus 110 of FIG. 11 may be a counterpart of the apparatus 50 of FIG. 5 or 6, but is not limited thereto.

In an embodiment at least some of the functionalities of the apparatus shown in FIG. 11 may be shared between two physically separate devices forming one operational entity. Therefore, the apparatus may be seen to depict the operational entity comprising one or more physically separate devices for executing at least some of the described processes.

In more specific terms, according to exemplary embodiments in relation to multiple source RSs for PUCCH/PUCCH/SRS beam indication, the UE is (re-)configured with a beam indication table in higher layers for the UE e.g. based on conducted measurements on DL RSs and UL RSs. It is further assumed that the gNB (e.g. apparatus 10 above) operates using wider SS block beams and more narrow CSI-RS beams that may be QCLed with SS block beams to operate a hierarchical beam management and a training functionality. According to such detailed exemplary embodiments of the present invention, the UE is configured with two indicator states for PUCCH/PUSCH/SRS transmissions. The table can be provided for any of the channels or a common table for all or for a subset of channels like for PUCCH and PUSCH. A (Re-)Configuration may take place in RRC or RRC$_+$ MAC CE levels, and L1 signaling would indicate when allocating UL signal (PUCCH/PUSCH/SRS) the used source RS for spatial transmit filter determination.

| Indicator state | RS set | RS type | RS index | Note |
|---|---|---|---|---|
| '000' | SRS res. set # A | Periodic SRS | SRI # 2 (of res. set A) | |
| '010' | SS blocks of a cell | SS block | SS block # 3 | Configured CSI-RS is a sub-beam (narrow) from SS block beam (wide) |
| | CSI-RS res. set # C | Periodic CSI-RS | CRI # 1 (of set # C) | |

Figure 18:
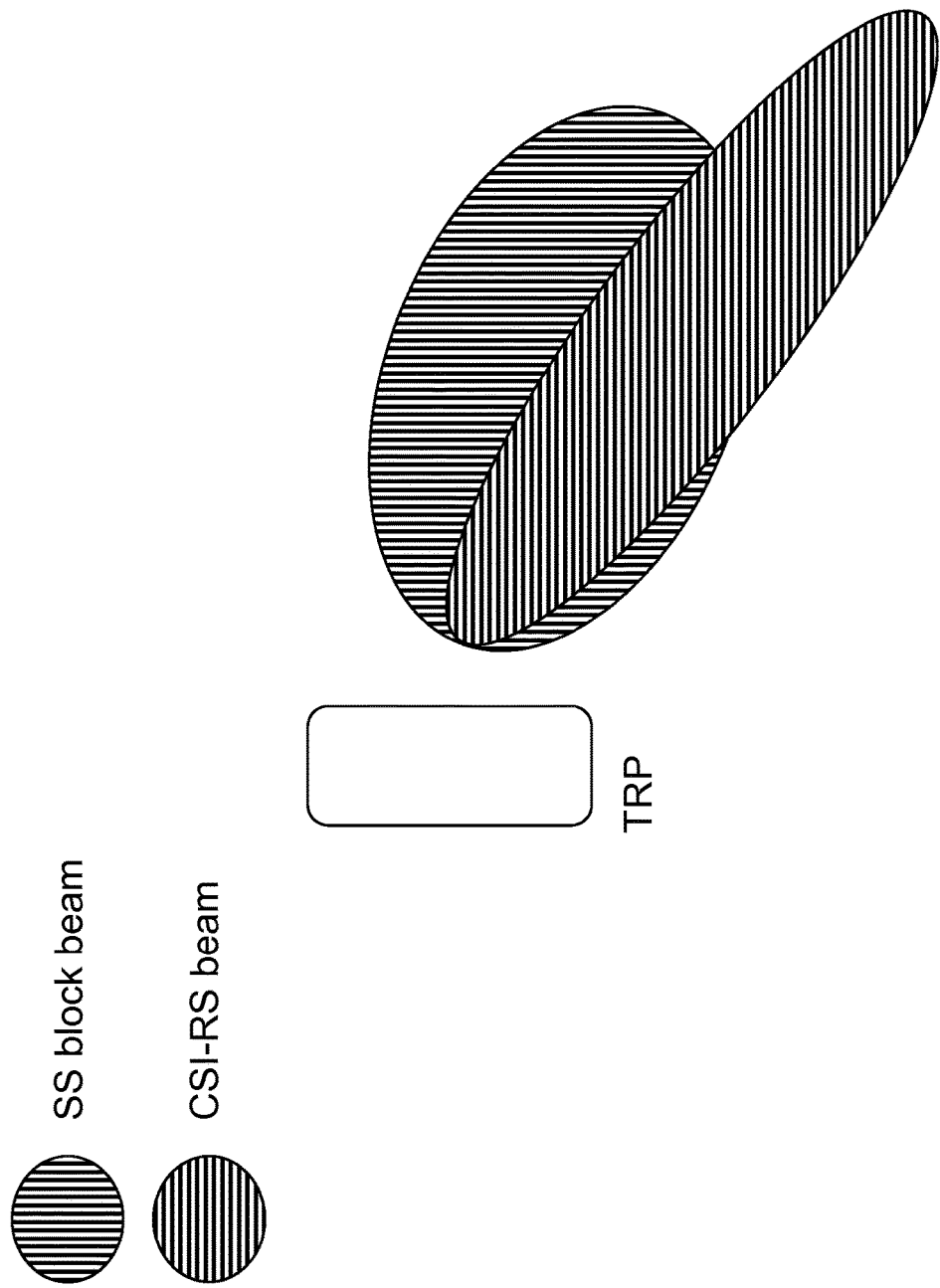
FIG. 18 shows a schematic diagram of an example illustration of an SS block beam and CSI-RS sub-beam.

According to exemplary embodiments of the present invention, the indicator state '010' would now comprise two downlink RSs as source RSs for uplink transmission. The source RSs are QCLed in spatial domain at least partially. In other words, the CSI-RS would characterize a narrow transmit beam which is a sub-beam from the SS block beam as shown in FIG. 18, illustrating an SS block beam and a CSI-RS sub-beam.

According to exemplary embodiments of the present invention, the SS block (RS) is transmitted periodically according to an SS burst set periodicity configured in the cell. The CSI-RS may be configured to be periodic, semi-persistent or aperiodic. Before the table can be configured, the UE has to provide beam measurement results for the RSs. Based on the results and the QCL assumption between the SS block and the CSI-RS, the gNB configures the indicator state '010' as described in table above. The UE is assumed to perform measurements on the RSs and to keep up to date the L1-RSRP results from RSs even without the need for explicit reporting.

When the gNB allocates the UE to transmit an UL signal (SRS, PUCCH or PUSCH) it will signal in an allocation message which indicator state to apply for the transmission (alternatively, this may also be indicated by a semi-static parameter). In case the gNB signals the indicator state '010' for the UE to be used, the UE will determine which one of the two configured DL RSs to use to determine spatial transmit filter for the transmission. It is enabled that the gNB would use the wide beam (SS block) beam to receive the transmission. In this detailed exemplary embodiment, a determination is based on a comparison between L1-RSRP results (latest) on the respective DL RSs. Assuming that the CSI-RS based L1 RSRP is higher, the UE determines the spatial TX filter for the transmission using CSI-RS as basis.

According to still further embodiments of the present invention, more than one CSI-RS sub-beam of the SS block is configured per indicator state.

According to embodiments of the present invention, the UE is advantageously able to use a narrow beam for its TX to improve link budget when determining based on measurements is possible. At gNB side, the advantage is that using a wider RX beam allows a higher UE multiplexing e.g. in frequency domain at the same time. This is beneficial especially at higher carrier frequencies where systems are time division duplex (TDD) and are having very wide bandwidths available.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 19:
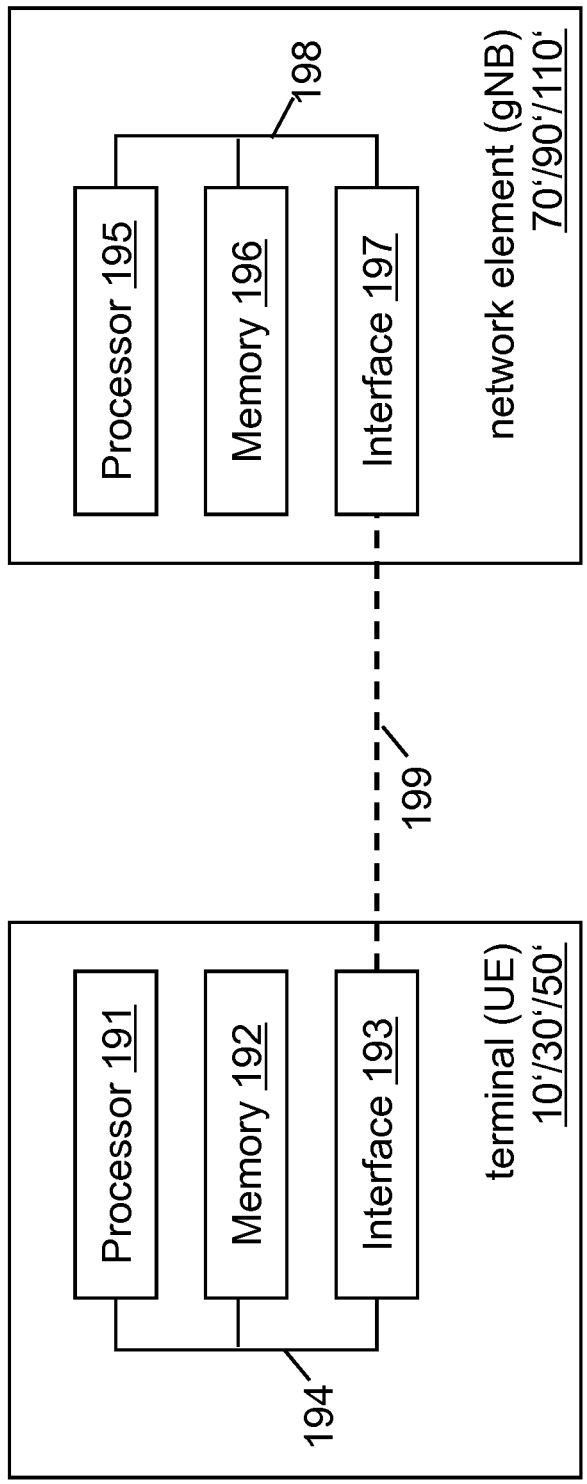
FIG. 19 is a block diagram alternatively illustrating apparatuses according to exemplary embodiments of the present invention.

In FIG. 19, an alternative illustration of apparatuses according to exemplary embodiments of the present invention is depicted. As indicated in FIG. 19, according to exemplary embodiments of the present invention, the apparatus (terminal) 10'/30'/50' (corresponding to the terminal 10/30/50) comprises a processor 191, a memory 192 and an interface 193, which are connected by a bus 194 or the like. Further, according to exemplary embodiments of the present invention, the apparatus (network element) 70'/90'/110' (corresponding to the network element 70/90/110) comprises a processor 195, a memory 196 and an interface 197, which are connected by a bus 198 or the like, and the apparatuses may be connected via link 199, respectively (in particular apparatus 10 with apparatus 70, apparatus 30 with apparatus 90, and/or apparatus 50 with apparatus 110).

The processor 191/195 and/or the interface 193/197 may also include a modem or the like to facilitate communication over a (hardwire or wireless) link, respectively. The interface 193/197 may include a suitable transceiver coupled to one or more antennas or communication means for (hardwire or wireless) communications with the linked or connected device(s), respectively. The interface 193/197 is generally configured to communicate with at least one other apparatus, i.e. the interface thereof.

The memory 192/196 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 191, at least one memory 192 including computer program code, and at least one interface 193 configured for communication with at least another apparatus. The processor (i.e. the at least one processor 191, with the at least one memory 192 and the computer program code) is configured to perform storing at least one beam determination entry, wherein each of said at least one beam determination entry is indicative of a respective first beam and at least one respective second beam narrower than said first beam and at least partially in quasi co-location with said first beam (thus the apparatus comprising corresponding means for storing), to perform receiving indicator information indicative of one of said at least one beam determination entry (thus the apparatus comprising corresponding means for receiving), and to perform selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry (thus the apparatus comprising corresponding means for selecting).

According to exemplary embodiments of the present invention, an apparatus representing the terminal 30 comprises at least one processor 191, at least one memory 192 including computer program code, and at least one interface 193 configured for communication with at least another apparatus. The processor (i.e. the at least one processor 191, with the at least one memory 192 and the computer program code) is configured to perform storing at least one quasi co-location configuration indicative of a respective first beam and at least one respective second beam narrower than said first beam and at least partially in quasi co-location with said first beam (thus the apparatus comprising corresponding means for storing), to perform storing, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration, and to perform selecting, for a predetermined physical channel, said primary beam as a transmission beam (thus the apparatus comprising corresponding means for selecting).

According to exemplary embodiments of the present invention, an apparatus representing the terminal 50 comprises at least one processor 191, at least one memory 192 including computer program code, and at least one interface 193 configured for communication with at least another apparatus. The processor (i.e. the at least one processor 191, with the at least one memory 192 and the computer program code) is configured to perform storing a downlink beam indication table indicative of available downlink beams (thus the apparatus comprising corresponding means for storing), to perform receiving indicator information indicative of an entry of said downlink beam indication table (thus the apparatus comprising corresponding means for receiving), and to perform determining, for a predetermined physical channel, a transmission beam based on a downlink beam corresponding to said indicator information (thus the apparatus comprising corresponding means for determining).

According to exemplary embodiments of the present invention, an apparatus representing the network element 70 comprises at least one processor 195, at least one memory 196 including computer program code, and at least one interface 197 configured for communication with at least another apparatus. The processor (i.e. the at least one processor 195, with the at least one memory 196 and the computer program code) is configured to perform providing at least one beam determination entry, wherein each of said at least one beam determination entry is indicative of a respective first beam and at least one respective second beam narrower than said first beam and at least partially in quasi co-location with said first beam (thus the apparatus comprising corresponding means for providing), to perform transmitting indicator information indicative of one of said at least one beam determination entry (thus the apparatus comprising corresponding means for transmitting), and to perform preparing for reception of traffic of a predetermined physical channel utilizing said first beam of said indicated one of said at least one beam determination entry (thus the apparatus comprising corresponding means for preparing).

According to exemplary embodiments of the present invention, an apparatus representing the network element 90 comprises at least one processor 195, at least one memory 196 including computer program code, and at least one interface 197 configured for communication with at least another apparatus. The processor (i.e. the at least one processor 195, with the at least one memory 196 and the computer program code) is configured to perform providing at least one quasi co-location configuration indicative of a respective first beam and at least one respective second beam narrower than said first beam and at least partially in quasi co-location with said first beam (thus the apparatus comprising corresponding means for providing), and to perform providing, for one of said at least one quasi co-location configuration, ranking information indicative of which of said respective first beam and said at least one respective second beam is a primary beam of said one of said at least one quasi co-location configuration and which of said respective first beam and said at least one respective second beam is a secondary beam of said one of said at least one quasi co-location configuration.

According to exemplary embodiments of the present invention, an apparatus representing the network element 110 comprises at least one processor 195, at least one memory 196 including computer program code, and at least one interface 197 configured for communication with at least another apparatus. The processor (i.e. the at least one processor 195, with the at least one memory 196 and the computer program code) is configured to perform providing a downlink beam indication table indicative of available downlink beams (thus the apparatus comprising corresponding means for providing), and to perform transmitting indicator information indicative of an entry of said downlink beam indication table (thus the apparatus comprising corresponding means for transmitting).

For further details regarding the operability/functionality of the individual apparatuses, reference is made to the above description in connection with any one of FIGS. 1 to 18, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for improved beam indication. Such measures exemplarily comprise storing at least one beam determination entry, wherein each of said at least one beam determination entry is indicative of a respective first beam and at least one respective second beam narrower than said first beam and at least partially in quasi co-location with said first beam, receiving indicator information indicative of one of said at least one beam determination entry, and selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

List of acronyms and abbreviations
3GPP 3rd Generation Partnership Project
CORESET control resource set
CRI CSI-RS resource index
CSI-RS channel state indicator reference signal
DCI downlink control information
DL downlink
DMRS demodulation reference signal gNB 5G Node B
HARQ hybrid automatic repeat request
L1-RSRP L1 reference signal received power
MCS modulation and coding scheme
NACK non-acknowledgement
NR New Radio
NR-PDCCH new radio physical downlink control channel
NR-PDSCH new radio physical downlink shared channel
PBCH physical broadcast channel
PDCCH physical downlink control channel
PDSCH physical downlink shared channel)
PRACH physical random access channel
PUCCH physical uplink control channel
PUSCH physical uplink shared channel
QCL quasi co-location
RRC radio resource control
RS reference signal
RSRP Reference Signal Received Power
RX reception
SRI SRS resource index
SRS sounding reference signal
SS synchronization signal
SSB synchronization signal block
TBS transport block size
TCI transmission configuration indication
TDD time division duplex
TRP transmission and reception point
TX transmission
UE user equipment
UL uplink

The invention claimed is:

1. An apparatus, comprising:
at least one processor;
at least one memory including computer program code; and
at least one interface configured for communication with at least another apparatus,
the at least one processor, with the at least one memory and the computer program code, being configured to cause the apparatus to perform:
storing at least one beam determination entry, wherein each of said at least one beam determination entry is indicative of a respective first beam and at least one respective second beam narrower than said first beam and at least partially in quasi co-location with said first beam,
receiving indicator information indicative of one of said at least one beam determination entry, and
selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry, wherein
said first beam of said indicated one of said at least one beam determination entry is set as a default beam of said indicated one of said at least one beam determination entry,
said at least one second beam of said indicated one of said at least one beam determination entry is selected as said transmission beam, and wherein
the at least one processor, with the at least one memory and the computer program code, are configured to cause the apparatus to further perform
receiving a non-acknowledgement message, wherein said non-acknowledgement message is a hybrid automatic repeat request non-acknowledgement message, and
selecting said default beam based on said non-acknowledgement message as said transmission beam.

2. The apparatus according to claim 1, wherein
each of said at least one beam determination entry includes a respective identifier, and
said indicator information corresponds to said identifier of said indicated one of said at least one beam determination entry.

3. The apparatus according to claim 1, wherein
the at least one processor, with the at least one memory and the computer program code, are configured to cause the apparatus to further perform
receiving said at least one beam determination entry.

4. The apparatus according to claim 1, wherein
the at least one processor, with the at least one memory and the computer program code, are configured to cause the apparatus to further perform
measuring a receiving power in relation to said first beam and said at least one second beam of said indicated one of said at least one beam determination entry.

5. The apparatus according to claim 1, wherein
the at least one processor, with the at least one memory and the computer program code, are configured to cause the apparatus to further perform
transmitting traffic of said predetermined physical channel utilizing said selected transmission beam.

6. The apparatus according to claim 1, wherein
each of said first beam and said at least one second beam of said indicated one of said at least one beam determination entry is represented by a respective reference signal.

7. The apparatus according to claim 1, wherein
the at least one processor, with the at least one memory and the computer program code, are configured to cause the apparatus to further perform
deriving a spatial transmission filter for said predetermined physical channel based on said selected transmission beam.

8. The apparatus according to claim 1, wherein
said selecting is based on receiving power measurement results in relation to said first beam, said at least one second beam, and a joint beam of said first beam and said at least one second beam.

9. The apparatus according to claim 1, wherein
a beam corresponding to a highest receiving power measurement result is selected.

10. The apparatus according to claim 1, wherein
said at least one second beam is selected if the receiving power measurement result in relation to said at least one second beam is higher than a predetermined threshold.

11. The apparatus according to claim 1, wherein
said at least one second beam is selected if the receiving power measurement result in relation to said at least one second beam is higher than the receiving power measurement result in relation to said first beam by at least a predetermined amount.

12. The apparatus according to claim 1, wherein
said at least one beam determination entry is configured in a beam indication table, or
said first beam is a synchronization signal block beam, or
said at least one second beam is a channel state information reference signal beam, or said predetermined physical channel is one of a physical uplink control channel and a physical uplink shared channel, or said at least one second beam at least partially in quasi co-location with said first beam is within a transmit aperture of said first beam, or said receiving power measurement result in relation to a specific beam is an L1 reference signal received power in relation to a reference signal representing said specific beam, or the apparatus is operable as or at a terminal, user equipment, mobile station or modem.

13. A method, comprising:

storing at least one beam determination entry, wherein each of said at least one beam determination entry is indicative of a respective first beam and at least one respective second beam narrower than said first beam and at least partially in quasi co-location with said first beam;

receiving indicator information indicative of one of said at least one beam determination entry; and selecting, for a predetermined physical channel, a transmission beam out of said first beam and said at least one second beam of said indicated one of said at least one beam determination entry based on receiving power measurement results in relation to said first beam and said at least one second beam of said indicated one of said at least one beam determination entry, wherein said first beam of said indicated one of said at least one beam determination entry is set as a default beam of said indicated one of said at least one beam determination entry, and said at least one second beam of said indicated one of said at least one beam determination entry is selected as said transmission beam, and wherein the method further comprises receiving a non-acknowledgement message, wherein said non-acknowledgement message is a hybrid automatic repeat request non-acknowledgement message, and selecting said default beam based on said non-acknowledgement message as said transmission beam.

* * * * *